Sept. 19, 1967  H. TYZACK  3,343,124
TRANSISTORIZED TURN DIRECTION INDICATOR CIRCUIT
Filed March 31, 1965

Inventor
Harold Tyzack.
By
Mueller & Aichele
Attys.

United States Patent Office 3,343,124
Patented Sept. 19, 1967

3,343,124
TRANSISTORIZED TURN DIRECTION INDICATOR CIRCUIT
Harold Tyzack, Schiller Park, Ill., assignor to Motorola, Inc., Franklin Park, Ill., a corporation of Illinois
Filed Mar. 31, 1965, Ser. No. 444,237
4 Claims. (Cl. 340—81)

ABSTRACT OF THE DISCLOSURE

Circuit for operating turn direction indicator lamps including flasher unit providing intermittent conduction and transistor having base to emitter path connected in series with turn direction indicator lamps, and the intermittent conduction of the flasher unit controls the conduction of the transistor to cause intermittent operation of the indicator lamps. The turn indicator switch initiates operation of the circuit and controls the lamps which are operated.

---

Figure 1:
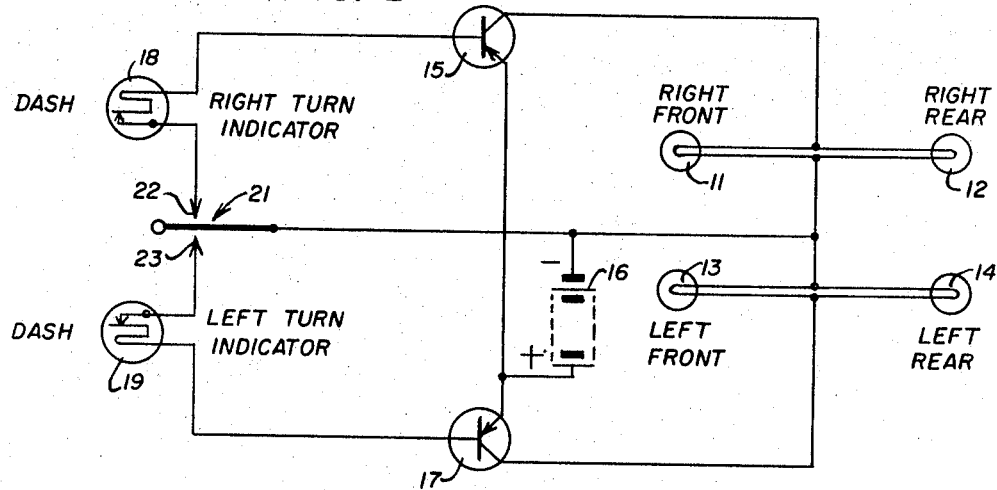

This invention relates to turn direction indicator circuits for vehicles and in particular to a transistorized circuit of this type.

Many vehicles utilize one or more lamps on each said which may be selectively and intermittently energized to indicate the direction in which the driver of the vehicle wishes to turn. Such turn direction indicator circuits often incorporate a flasher device comprising a filament and a bimetal element which functions to cause intermittent closure of the circuit through the lamp for intermittent energization of the filament.

Flasher lamps have been used as the flasher device in series with the turn indicator lamps and a turn switch in order to cause intermittent energization of the turn indicator lamps upon closure of the turn switch. Heretofore, such circuits have often exhibited short life insofar as replacement of the flasher lamp is concerned. This has been normally due to the high current which the lamp must carry. Furthermore, flasher devices capable of carrying high current are often very expensive. Finally such circuits have exhibited a flash rate which varied undesirably according to the loading of the electrical circuit because of the variation in current.

It is an object of this invention to provide a vehicle turn direction indicator circuit of improved construction and longer life.

Another object of the invention is to provide a turn direction indicator circuit of low cost and which is not susceptible to variation in flash rate with lamp current.

A feature of the invention is the provision of a turn direction indicator circuit wherein a transistor couples a flasher lamp to an indicator lamp and is repsonsive to closure of the turn switch to cause intermittent operation of the indicator lamp.

Another feature of the invention is the provision of a turn indicator circuit including a pair of indicator lamps mounted on respective sides of a vehicle and coupled in series with the emitter and collector of a transistor across a source of potential. The base and emitter of the transistor are connected in series with a flasher lamp across the turn switch.

Still another feature of the invention is the provision of a pair of turn indicator lamps on respective sides of a vehicle and respectively connected in series with a turn switch and the emitter collector circuit of a transistor across a source of potential. The transistor is intermittently rendered conductive by means of a flasher lamp series connecting the base and emitter across the source of potential.

Figure 2:
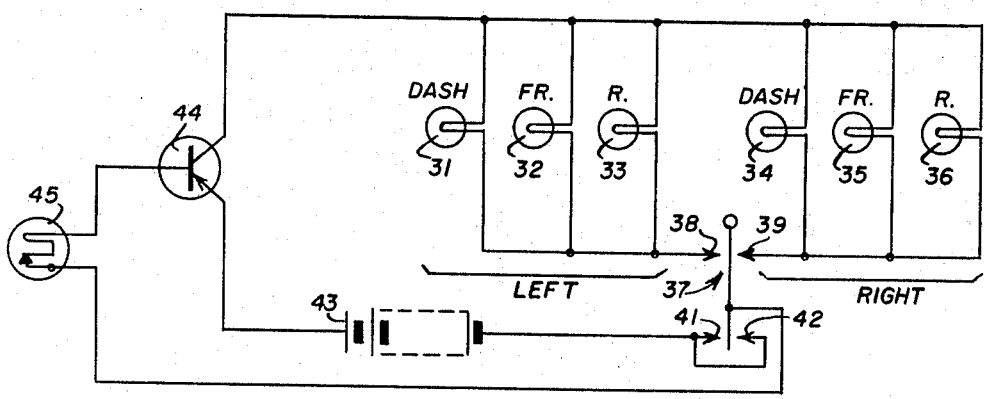

In the drawing:

FIG. 1 is a schematic diagram of a turn direction indicator circuit constructed in accordance with the invention; and FIG. 2 is a schematic diagram of another embodiment of the invention.

The invention comprises an improved turn indicator circuit for a vehicle having a source of direct current potential. The indicator circuit includes a lamp mounted on the vehicle for visibly indicating the turn direction by intermittent energization. A transistor has its emitter and collector regions connected in series with the lamp across the source of potential. The emitter and base regions of the transistor are connected in series with a turn switch and with a flasher lamp across the source of potential to provide intermittent emitter-base current when the turn switch is closed in response to the intermittent conduction of the flasher lamp. The transistor therefore conducts in response to emitter-base current to energize the lamp.

Referring more particularly to FIG. 1, an embodiment of the invention is shown schematically. Right front lamp 11 and right rear lamp 12 may be mounted on the right side of the vehicle and are connected in parallel. Similarly, left front lamp 13 and left rear lamp 14 may be mounted on the left side of the vehicle and are also connected in parallel. A transistor 15 has its primary current path (emitter and collector regions) connected in series with the parallel combination of lamps 11 and 12 across a source of direct current potential, storage battery 16. Similarly, a transistor 17 has its primary current path (emitter and collector regions) connected in series with the parallel combination of lamps 13 and 14 across storage battery 16.

The transistors 15 and 17 are controlled for intermittent operation of lamps 11–14 by a pair of flasher lamps 18 and 19. Flasher lamps 18 and 19 are of a type, commonly available, which incorporate a filament in series with a bimetal switch. Upon sufficient heating of the filament and the bi-metal switch, the bi-metal switch opens and the filament cools. Cooling of the bi-metal switch causes closure, and the filament is energized once more. A turn switch 21, of a type commonly in use, has a pair of contacts 22 and 23 associated respectively with flasher 18 and 19. Closure of switch 21 to contact 22 connects flasher lamp 18 in series with the control current path (emitter and base regions) of transistor 15 across storage battery 16. Similarly, closure of switch 21 to contact 23 connects flasher lamp 19 in series with the control current path (base and emitter regions) of transistor 17 across storage battery 16.

The operation of respective pairs of lamps 11–12 and 13–14 is governed by the position of turn switch 21. Thus, when it is desired to turn right, turn switch 21 is moved to contact 22. The intermittent opening and closing of flasher lamp 18 will cause intermittent emitter to base curent flow. Accordingly, this causes intermittent emitter to collector current flow and hence intermittent energization of lamps 11 and 12. When it is desired to turn left, turn switch 21 is moved to contact 23 and a similar function occurs to energize lamps 13 and 14 through transistor 17. Lamps 18 and 19 may be placed on the dash panel of the vehicle to indicate which of the pairs of indicator lamps is being energized.

The embodiment of FIG. 2 utilizes only one transistor and one flasher lamp, but utilizes a turn switch with two pairs of contacts. In this embodiment of the invention, lamps 31, 32 and 33 are the dash panel, front and rear lamps respectively for indicating left turns, and lamps 34, 35 and 36 are the dash panel, front, and rear lamps respectively for indicating right turns. The sets of lamps for left and right turns are parallel connected with each other through a turn switch 37. Turn switch 37 has a pair of contacts 38 and 39 connected to respective left and right sets of indicator lamps. A second pair of contacts 41 and 42 are provided with turn switch 37 so that the source of direct current potential, storage battery 43, will be connected to the appropriate one of contacts 38 and 39 when the turn indicator switch 37 is moved from its neutral position.

As was the case with the embodiment of FIG. 1, the right and left indicator lamps are power transistor controlled. Transistor 44 has its primary current path (collector and emitter regions) connected in series with the respective parallel groups of indicator lamps and through turn switch 37 across storage battery 43. A flasher lamp 45 is connected in series with the control current path (base and emitter regions) of transistor 44 through turn switch 37 across storage battery 43.

Left and right turns are indicated by moving turn indicator switch to contacts 39 and 38 respectively. Moving the turn switch will also close one of contacts 41 and 42 thereby connecting the flasher lamp and the base and emitter regions of transistor 44 across storage battery 43. This causes current flow from emitter to base in transistor 44, which current is intermittent due to the operation of flasher lamp 45. This will cause transistor 44 to intermittently conduct from emitter to collector, thereby intermittently energizing the respective groups of indicator lamps. If it is desired, dash lamps 31 and 34 might be eliminated and flasher lamp 45 mounted in the dash panel. In the latter case, indication of direction would not be possible and the flasher lamp would merely indicate that the turn switch was closed.

The circuit of FIG. 2 could be modified to incorporate an NPN transistor rather than a PNP transistor as shown. In such a circuit, the base of the transistor would be series connected through the flasher lamp, indicator lights and turn switch to the positive side of the battery so that the transistor would conduct when the turn-switch is closed. In such a circuit, the need for a second pair of contacts on the turn-switch would be obviated.

Because the flasher lamp or lamps of the invention are utilized in the base circuit of the transistor or transistors, their current rating may be quite low. Thus a relatively low cost flasher lamp or lamps may be utilized. Furthermore, because there is less current in the flasher lamps, their life is greatly extended. The cost saving afforded by utilizing a low cost flasher lamp more than offsets the cost of the additional transistor or transistors required in the circuit. Furthermore, by proper selection of transistor or transistors, the flash rate can be more readily controlled because the current through the flasher lamp may be easily governed. This aids in making the flash rate independent of the indicator lamp current.

It may therefore be seen that the invention provides an improved turn direction indicator circuit for a vehicle, which system is low in cost and long in life. Furthermore, the system is not susceptible to flash rate variation with variation in indicator lamp current.

What is claimed is:

1. A turn direction indicator circuit for a vehicle having a source of direct current potential, including in combination, indicator means mounted on the vehicle for visibly indicating the turn direction by intermittent electrical energization, transistor means having a pirmary current path and a control current path and being responsive to current in said control current path to conduct current through said primary current path, means for connecting said primary current path in series with said indicator means across the source of potential, flasher means responsive to voltage applied thereto to intermittently conduct current, and means including a turn switch connecting the control current path of said transistor means in series with said flasher means across the source of potential to provide intermittent control current therethrough when said turn switch is closed and in response to the conduction of said flasher means, said transistor means conducting through said primary current path in response to the control current to energize said indicator lamp.

2. A turn direction indicator circuit for a vehicle having a source of direct potential, including in combination, an indicator lamp mounted on the vehicle for visibly indicating the turn direction by intermittent energization, a transistor having base, emitter and collector regions, means connecting said emitter and collector regions in series with said indicator lamp across the source of potential, a flasher device responsive to voltage applied thereto to intermittently conduct, and means including a turn switch connecting the emitter and base regions of said transistor in series with said flasher device across the source of potential to provide intermittent emitter to base current when said turn switch is closed according to the conduction of said flasher device, said transistor conducting in response to emitter to base current to energize said indicator lamp.

3. A turn direction indicator circuit for a vehicle having a source of direct current potential, including in combination, first and second indicator lamps mounted on respective sides of the vehicle for visibly indicating the turn direction by intermittent energization, first and second transistors each having base, emitter and collector regions, means connecting said emitter and collector regions of each of said transistors in series with a respective one of said first and second indicator lamps across the source of potential, first and second flasher lamps responsive to voltage applied thereto to intermittently conduct, and means including a turn switch connecting said emitter and base regions of each of said first and second transistors in series with a respective one of said flasher lamps across the source of potential to provide intermittent emitter-base current when said turn switch is closed according to the conduction of said flasher lamp, said transistor conducting in response to emitter-base current to energize said indicator lamp connected thereto.

4. A turn direction indicator circuit for a vehicle having a source of direct current potential, including in combination, first and second indicator lamps each mounted on a respective side of the vehicle for visibly indicating the turn direction by intermittent energization, a transistor having base, emitter and collector regions, switch means movable to first and second closed positions for connecting said emitter and collector regions in series selectively with said first and second indicator lamps across the source of potential, and a flasher lamp responsive to voltage applied thereto to intermittently conduct, said switch means including means for connecting the emitter and base regions of said transistor in series with said flasher lamp across the source of potential to provide intermittent emitter-base current when said second switch is closed according to the conduction of said flasher lamp, said transistor conducting in response to emitter-base currenth to intermittently energize one of said indicator lamps.

References Cited
UNITED STATES PATENTS 3,002,127   9/1961   Grontkowski _____ 340—331 X
3,189,796   6/1965   Tipton _____ 317—148.5 X NEIL C. READ, *Primary Examiner.*

A. WARING, *Assistant Examiner.*